US008935324B2

(12) United States Patent
Lee

(10) Patent No.: US 8,935,324 B2
(45) Date of Patent: Jan. 13, 2015

(54) APPARATUS AND METHOD FOR PROVIDING INSTANT MESSAGING AND PRESENCE SERVICE IN MOBILE COMMUNICATION SYSTEM

(75) Inventor: Jun-Yeop Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 697 days.

(21) Appl. No.: 12/437,237

(22) Filed: May 7, 2009

(65) Prior Publication Data

US 2010/0049801 A1 Feb. 25, 2010

(30) Foreign Application Priority Data

Aug. 19, 2008 (KR) ........................ 10-2008-0081059

(51) Int. Cl.

| | |
|---|---|
| ***G06F 15/16*** | (2006.01) |
| ***H04L 12/58*** | (2006.01) |
| *H04W 4/12* | (2009.01) |
| *H04W 76/00* | (2009.01) |

(52) U.S. Cl.

CPC .............. *H04L 12/581* (2013.01); *H04L 51/04* (2013.01); *H04L 12/5895* (2013.01); *H04W 4/12* (2013.01); *H04W 76/002* (2013.01)

USPC ............ 709/204; 709/203; 709/205; 709/217

(58) Field of Classification Search

USPC ................................. 709/204, 203, 217, 205

See application file for complete search history.

(56) References Cited

U.S. PATENT DOCUMENTS

| | | | | |
|---|---|---|---|---|
| 2002/0129107 | A1* | 9/2002 | Loughran et al. | 709/206 |
| 2004/0176112 | A1* | 9/2004 | Beckmann et al. | 455/458 |
| 2005/0080863 | A1* | 4/2005 | Daniell | 709/206 |
| 2006/0095514 | A1* | 5/2006 | Wang et al. | 709/204 |
| 2006/0105795 | A1* | 5/2006 | Cermak et al. | 455/518 |
| 2007/0264982 | A1* | 11/2007 | Nguyen et al. | 455/414.1 |
| 2008/0113678 | A1* | 5/2008 | Hand et al. | 455/466 |
| 2009/0131088 | A1* | 5/2009 | Kirchmeier et al. | 455/466 |
| 2010/0111282 | A1* | 5/2010 | Fusco et al. | 379/211.02 |
| 2011/0055713 | A1* | 3/2011 | Gruenewald et al. | 715/738 |

FOREIGN PATENT DOCUMENTS

| | | |
|---|---|---|
| KR | 10-2001-0098297 A | 11/2001 |
| KR | 10-2004-0061225 A | 1/2007 |

* cited by examiner

*Primary Examiner* — Lan-Dai T Truong

(74) *Attorney, Agent, or Firm* — Jefferson IP Law, LLP

(57) ABSTRACT

An apparatus and a method for automatically accessing a relevant group when determining that message inform information is transmitted from the relevant group in order to determine that the message is generated from the relevant group without accessing the relevant group are provided. The apparatus includes a group service server and a mobile terminal. The group service server generates message inform information informing of presence of a message which a user, registered in a relevant group, desires to transfer to all users registered in the relevant group when transmitting a group message. When determining reception of the message inform information informing of presence of a message which the user registered in the relevant group desires to transfer to all of the users registered in the relevant group, the mobile terminal accesses the group which has transmitted the message, receives, and stores the relevant group message.

6 Claims, 4 Drawing Sheets

MOBILE TERMINAL(100)
108 INPUT UNIT
110 DISPLAY UNIT
106 MEMORY UNIT
102 CONTROLLER
112 COMMUNICATION UNIT
104 GROUP MESSAGE DETERMINING UNIT
GROUP SERVICE SERVER (120)
126 COMMUNICATION UNIT
122 SERVER CONTROLLER
124 MESSAGE GENERATOR

APPARATUS AND METHOD FOR PROVIDING INSTANT MESSAGING AND PRESENCE SERVICE IN MOBILE COMMUNICATION SYSTEM

PRIORITY

This application claims the benefit under 35 U.S.C. §119 (a) of a Korean patent application filed in the Korean Intellectual Property Office on Aug. 19, 2008 and assigned Serial No. 10-2008-0081059, the entire disclosure of which is hereby incorporated by reference.

BACKGROUND OF THE INVENTION

1. Field of the Invention

The present invention relates to Instant Messaging & Presence Service (IMPS). More particularly, the present invention relates to an apparatus and a method for automatically accessing a relevant group when determining that message inform information is transmitted from the relevant group in order to determine the message generated from the relevant group without accessing the relevant group.

2. Description of the Related Art

A mobile terminal is a necessity indispensable to a modern people and is widely used without distinction of age or sex. A service provider and a terminal manufacturer competitively develop a product (or service) for differentiation from other companies.

For example, a plurality of services is provided by a mobile communication service provider. Examples of the services include a service developed and provided by a mobile communication service provider such as a wireless Internet access, a short message transmission, a multimedia message transmission, and a wireless on-line game. Examples of services developed/produced and provided by a mobile terminal manufacturer itself include a phone-book management, a memo writing function, a message writing function, a schedule management, games, a camera function, an electronic calculator, an alarm function, a bell setting, and the like.

The mobile communication service provider provides not only the above-mentioned services, but also an Instant Messaging & Presence Service (IMPS) such as an instant message service for chatting with a counterpart mobile terminal in real-time and for performing communication using short messages, that is, one-to-one chatting and group chatting, and a presence service for determining a current status of a counterpart mobile terminal, that is, a power on/off status, and current position information.

The above-described IMPS is a technology for a new communication unit based on Internet technologies. The IMPS is used for exchanging a message and presence information between a mobile terminal and a mobile communication service, using an Internet-based instant messaging service. A representative characteristic of IMPS includes a status service and an instant messaging service.

Also, the IMPS supports a group function to allow users registered in a group designated by a user to give and take instant messages to and from one another. Therefore, the IMPS can be used by small-scale business users such as a group inside a company or the same work group performing communication related to a frequent job.

However, in the case where instant messages are given and taken using the group function, only a user who has accessed the group can determine if a new message has been sent.

That is, even when a manager of the group transfers a public notice to all of the users registered in the group, if a user does not access the group, there is no way for the user to become aware of the public notice.

SUMMARY OF THE INVENTION

An aspect of the present invention is to address at least the above-mentioned problems and/or disadvantages and to provide at least the advantages described below. Accordingly, aspect of the present invention is to provide an apparatus and a method for receiving a message generated from a relevant group in the case where a group function service of Instant Messaging & Presence Service (IMPS) is provided in a mobile communication system.

Another aspect of the present invention is to provide an apparatus and a method for receiving a message generated from a relevant group without accessing the relevant group in a mobile communication system.

Still another aspect of the present invention is to provide an apparatus and a method for, when it is determined that there is a message generated from a relevant group, automatically accessing the relevant group and receiving the message in a mobile communication system.

In accordance with an aspect of the present invention, a group service server for providing a group service is provided. The group service server includes a message generator for generating message inform information informing of presence of a message to be transferred to all users registered in a relevant group when transmitting a group message, and a server controller for transmitting the generated message inform information to all of the users registered in the group.

In accordance with another aspect of the present invention, a mobile terminal for receiving a group service message is provided. The mobile terminal includes a group message determining unit for determining message inform information informing of presence of a message which a user registered in a relevant group desires to transfer to all users registered in the relevant group, and a controller for, when the group message determining unit determines that the message inform information is received, accessing the group which has transmitted the message, receiving a relevant group message, and for storing the received message.

In accordance with still another aspect of the present invention, a method for providing a group service in a group service server is provided. The method includes generating message inform information informing of presence of a message which a user registered in a relevant group desires to transfer to all users registered in the relevant group when a group message is transmitted, and transmitting the generated message inform information to all of the users registered in the group.

In accordance with yet another aspect of the present invention, a method for receiving a group service message in a mobile terminal is provided. The method includes, when receiving message inform information informing of presence of a message which a user registered in a relevant group desires to transfer to all users registered in the relevant group, accessing a group which has transmitted the message, receiving a relevant group message, and storing the received group message.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention will be described herein below with reference to the accompanying drawings. In the following descriptions, well-known functions or constructions are not described in detail since they would obscure the invention in unnecessary detail.

Exemplary embodiments of the present invention provide an apparatus and a method for automatically accessing a relevant group when determining there is message inform information transmitted from the relevant group in order to determine the message generated from the relevant group without accessing the relevant group in a mobile communication system providing an Instant Messaging & Presence Service (IMPS).

Figure 1:
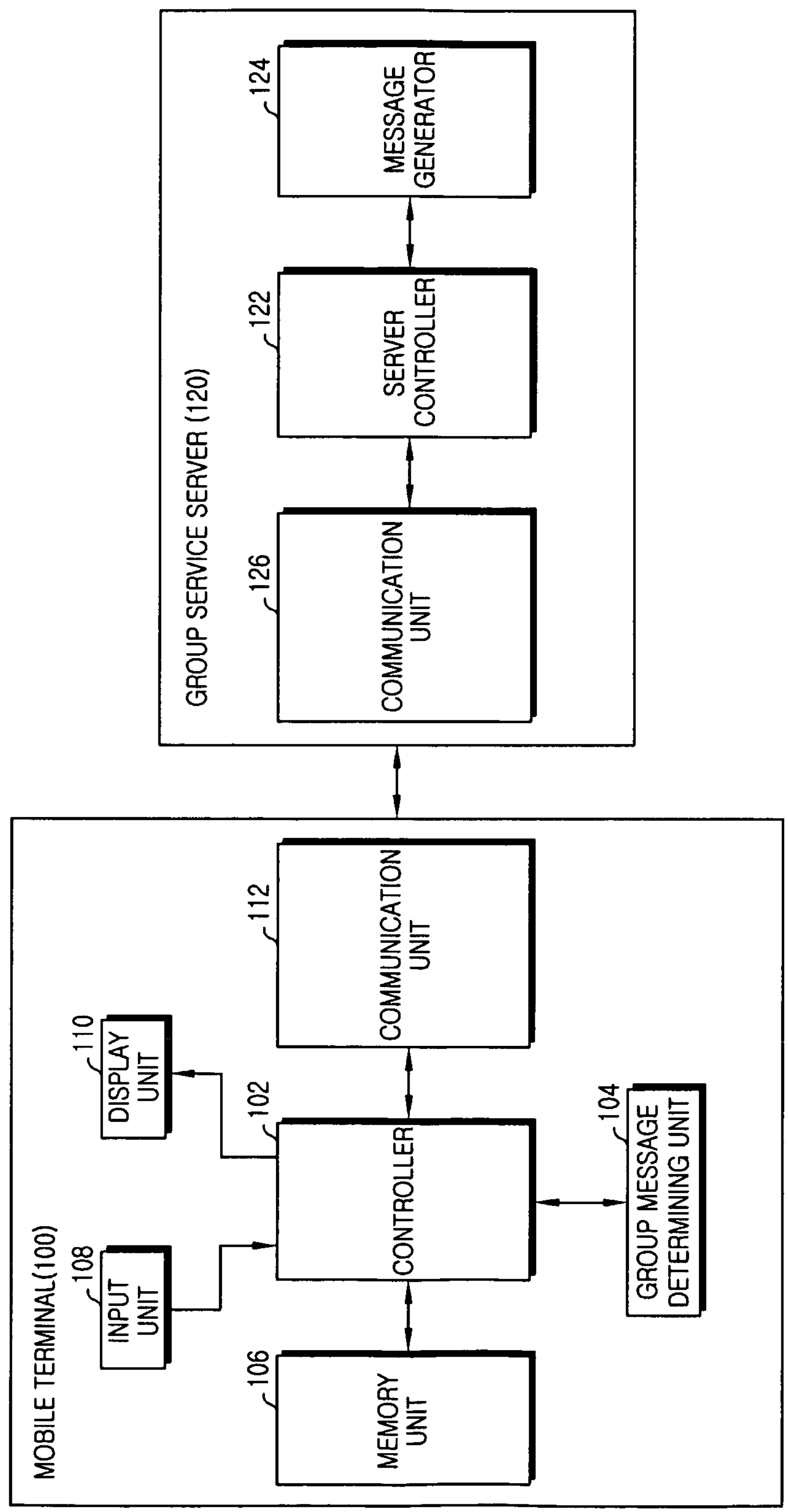
FIG. 1 is a block diagram illustrating a mobile communication system for providing an IMPS according to an exemplary embodiment of the present invention.

FIG. 1 is a block diagram illustrating a mobile communication system for providing an IMPS according to an exemplary embodiment of the present invention.

Referring to FIG. 1, the mobile communication system may include a mobile terminal 100 and a group service server 120.

First, the mobile terminal 100 providing the IMPS may include a controller 102, a group message determining unit 104, a memory unit 106, an input unit 108, a display unit 110, and a communication unit 112.

The controller 102 of the mobile terminal 100 processes and controls overall operations of the mobile terminal 100, for example, voice communication and data communication. In an exemplary implementation, when it is determined that information informing of reception of an IMPS service message is received, the controller 102 accesses a relevant group using access information stored in advance. In an exemplary implementation, login information of the relevant group is used as the access information.

After that, the controller 102 receives a message which is transferred to all users registered in the relevant group, stores the received message in the memory unit 106, and releases the access to the relevant group. That is, when the controller 102 cannot access the relevant group, the controller 102 of the mobile terminal according to an exemplary embodiment of the present invention does not perform a direct access to the relevant group but performs a process such that the message transmitted from the relevant group can be determined afterward.

The group message determining unit 104 determines whether a message is transferred to all of the users registered in the relevant group using message inform information received from the group service server 120 in response to an instruction of the controller 102, and provides a result thereof to the controller 102.

The memory unit 106 may include a Read Only Memory (ROM), a Random Access Memory (RAM), a flash ROM, and the like. The ROM may store a program for process operations and control operations of the controller 102 and the group message determining unit 104, and various reference data.

The RAM serves as a working memory of the controller 102 and stores temporary data generated while various programs are executed. Also, the flash ROM stores various data which needs to be preserved and may be updated, such as a phone book, an outgoing message, an incoming message, and the like.

The input unit 108 includes a plurality of function keys such as numerical key buttons of 0 to 9, a menu button, a cancel (delete) button, an OK button, a talk button, an end button, an Internet access button, navigation key (or direction key) buttons, and letter input keys. The input unit 108 provides key input data corresponding to a key pressed by a user to the controller 102.

The display unit 110 displays status information generated during operations of the mobile terminal 100, a limited number of letters, and a large amount of moving images and still images. The display unit 110 may include a color Liquid Crystal Display (LCD). In this case, the display unit 110 may include a controller for controlling the LCD, a video memory in which image data is stored and an LCD element. If the LCD is provided as a touch screen, the display unit 110 may perform a part or all of the functions of the input unit 108.

The communication unit 112 transmits/receives radio signals of data output/input via an antenna (not shown). For example, in case of performing transmission, the communication unit 112 channel-codes and spreads data to be transmitted, and performs a Radio Frequency (RF) process on the data. In case of performing reception, the communication unit 112 recovers data by converting a received RF signal into a baseband signal, de-spreading, and channel-decoding the baseband signal.

The function of the group message determining unit 104 of the mobile terminal 100 can be also performed by the controller 102 of the mobile terminal 100. The group message determining unit 104 in an exemplary embodiment of the present invention is separately illustrated and provided for convenience in description, and not for purpose of limiting the scope of the present invention. It would be understood by those skilled in the art that various modifications can be made within the scope of the present invention. For example, the controller 102 can be configured to perform all of the functions.

The group service server 120 may include a server controller 122, a message generator 124, and a communication unit 126.

Here, the server controller 122 controls operations of the group service server 120, and, when a group message transmission event such as a situation where a user registered in a group service provided by a service provider desires to transfer a message to all users registered in a relevant group occurs, determines information of the message to be transferred to all of the users registered in the relevant group, and generates message inform information based on the determined information. After that, the server controller 122 transmits the generated message inform information to all of the users registered in the relevant group. At this point, the server controller 122 may allow the message inform information to be transmitted to all of the users registered in the relevant group at a time set by the user.

The message generator 124 of the group service server 120 generates message inform information in response to an instruction of the group server controller 122. Here, the message inform information denotes a message informing of presence of a message (for example, a public notice) which a user, registered in a group provided by a service provider, desires to transfer to all users registered in the group. The communication unit 126 of the group service server 120 transmits the message inform information to the mobile terminal 100.

Up to now, an exemplary apparatus for automatically accessing a relevant group when determining that message inform information is transmitted from the relevant group in order to determine the message generated from the relevant group in a mobile communication system providing an IMPS has been described. Hereinafter, an exemplary method for automatically accessing a relevant group when determining that message inform information is transmitted from the relevant group in order to determine the message generated from the relevant group will be described.

Figure 2:
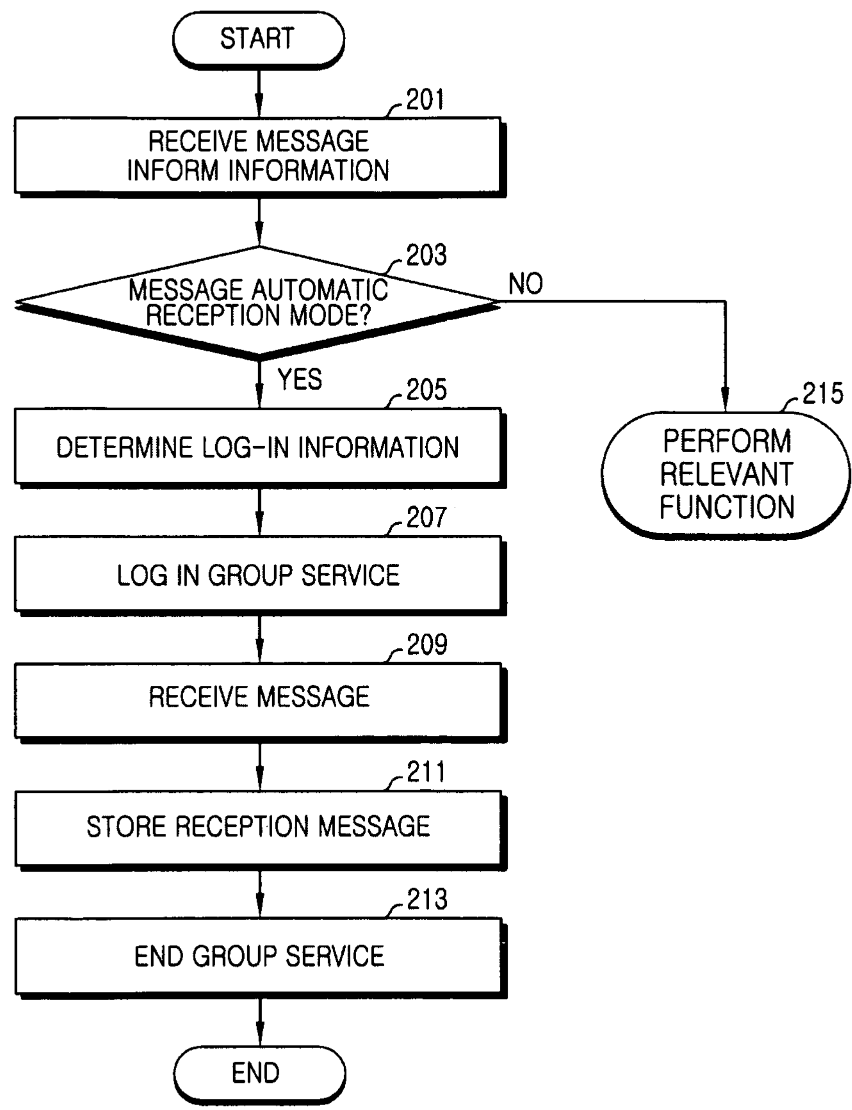
FIG. 2 is a flowchart illustrating a procedure of receiving a group service message at a mobile terminal according to an exemplary embodiment of the present invention.

FIG. 2 is a flowchart illustrating a procedure of receiving a group service message at a mobile terminal according to an exemplary embodiment of the present invention.

Referring to FIG. 2, in step 201, a mobile terminal receives message inform information from a group service server. Here, the mobile terminal denotes a mobile terminal which can use a group service, and the received message inform information denotes a message informing of presence of a message (for example, a public notice) which a user, registered in a group provided by the group service server, i.e., a service provider, desires to transfer to all users registered in the group.

In step 203, the mobile terminal determines whether a message reception mode of the mobile terminal is an automatic reception mode.

In the automatic reception mode, when a message related to an IMPS is received while the IMPS is not being used, a relevant service is automatically accessed and the message is automatically received.

When it is determined that the message reception mode is not the automatic reception mode in step 203, the mobile terminal performs a relevant function (for example, a standby mode) in step 215.

When it is determined that the message reception mode is the automatic reception mode in step 203, the mobile terminal determines login information required for using the group service in step 205, and accesses the group service in step 207 using the login information determined in step 205. Step 207 denotes the accessing of the group service in order to receive a message transmitted by the group service server.

In step 209, the mobile terminal receives the message transmitted by the group service server 120, and in step 211, stores the received message.

Although not illustrated, the process of FIG. 2 also includes the displaying of the received message. In an exemplary implementation, the message may be automatically displayed, the automatic display being selected by the user. Also, because the received message has been stored, the message may also be retrieved at a later time according to user's convenience.

In step 213, the mobile terminal ends the group service, that is, logs out from the group service which the mobile terminal had logged into in step 207.

After that, the mobile terminal ends the operation.

An exemplary method for receiving a group service message in an automatic reception mode at a mobile terminal has been described. However, the present invention may also allow the mobile terminal to access a relevant group depending on selection of a user as well as in the automatic reception mode.

For example, the process of FIG. 2 may include a decision step, following the negative result of step 203, in which it is determined if a user selects to access the relevant group. If the user decides such access, the process continues with step 205 and otherwise proceeds to step 215.

Figure 3:
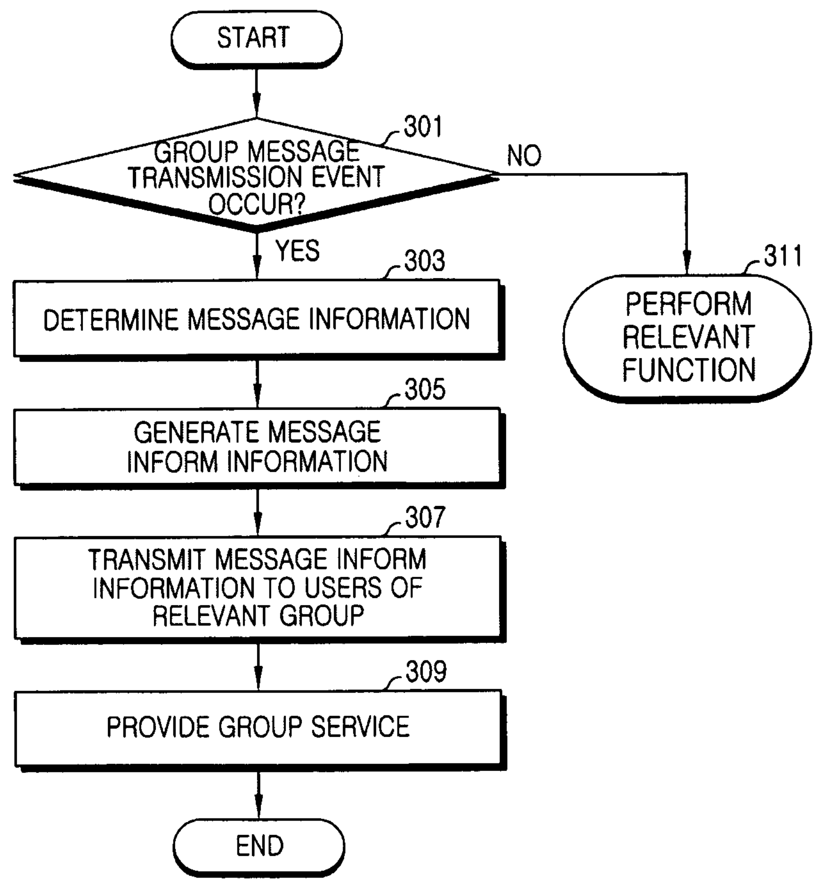
FIG. 3 is a flowchart illustrating a procedure of providing a group service at a group service server according to an exemplary embodiment of the present invention.

FIG. 3 is a flowchart illustrating a procedure of providing a group service at a group service server according to an exemplary embodiment of the present invention.

Referring to FIG. 3, in step 301, a group service server determines whether a group message transmission event occurs. Here, the group message transmission event denotes a situation where a user, registered in a relevant group service provided by a service provider, desires to transfer a message to all users registered in the relevant group.

When the group message transmission event does not occur, the group service server performs a relevant function (for example, a group service which is being provided) in step 311.

In contrast, when the group message transmission event occurs, in step 303, the group service server determines message information, and in step 305, generates message inform information. Here, the message information may include an attached file (for example, a media file and an image file) as detailed information of a message which the user registered in the group service desires to transfer to all users registered in the relevant group. Also, the message inform information includes information regarding a message to be transferred to all of the users registered in the relevant group, and may include a title and caller information of the message. The message inform information can be a substantial message to be transferred to all of the users registered in the relevant group.

In step 307, the group service server transmits the message inform information generated in step 305 to all of the users registered in the relevant group, and in step 309, provides a group service. At this point, the group service server may transmit the message inform information without delay or at a time set by the user who desires to transmit the message.

After that, the group service server ends the operation.

Figure 4C:
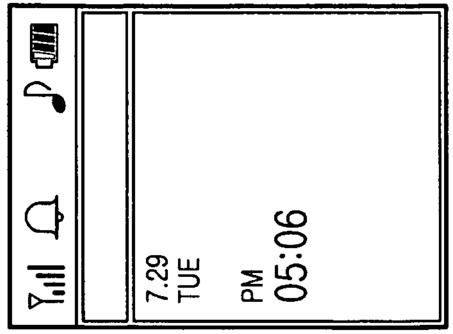
FIGS. 4A-4C illustrate a procedure of receiving a group service message at a mobile terminal according to an exemplary embodiment of the present invention.
Figure 4B:
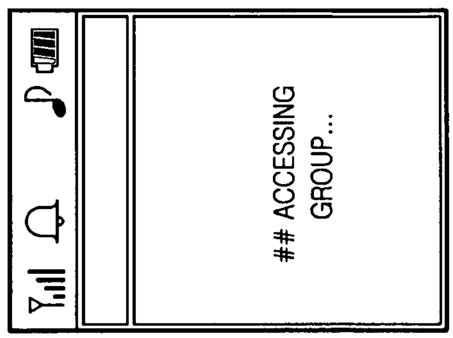
Figure 4A:
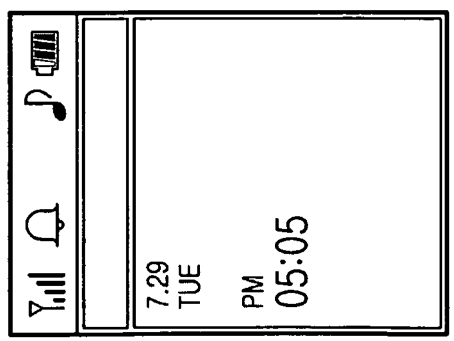

FIGS. 4A-4C illustrate a procedure of receiving a group service message at a mobile terminal according to an exemplary embodiment of the present invention.

FIG. 4A is a view illustrating an operation screen before a group message is received in a mobile terminal according to an exemplary embodiment of the present invention.

Referring to FIG. 4A, the mobile terminal is operating in a standby status which is a status before the group service message is received. At this point, the mobile terminal can receive the group service message not only in the standby status, but also during another operation such as a game, media file reproduction (for example, MP3, moving image file, etc.), a camera operation, and the like.

FIG. 4B is a view illustrating a process of performing an automatic reception mode in a mobile terminal according to an exemplary embodiment of the present invention.

Referring to FIG. 4B, when receiving message inform information from a group service server, the mobile terminal obtains login information, which includes user information for accessing a relevant group, and accesses the relevant group. That is, the mobile terminal performs a login process. At this point, the mobile terminal accesses the relevant group, receives a message corresponding to the message inform information, and stores the received message in a memory unit.

FIG. 4C is a view illustrating a status after group message receiving is completed in a mobile terminal according to an exemplary embodiment of the present invention.

Referring to FIG. 4C, the mobile terminal accesses a group corresponding to the message inform information, receives and stores a message, and returns to the operation status of the terminal before reception of the message inform information. In the example of FIGS. 4A-4C, the mobile terminal receives and stores the group message when the message inform information is received in the standby status as illustrated in FIG. 4A, and then returns the operation mode of the mobile terminal into the standby mode.

Up to now, a mobile terminal and a group service server according to an exemplary embodiment of the present invention have been separately described. Hereinafter, an operation process of a mobile communication system including the mobile terminal and the group service server performing the above-described operations will be described.

First, when a group message transmission event such as a situation in which a user registered in a group service provided by a service provider of a group service server desires to transfer a message to all users registered in a relevant group occurs, the group service server determines message information and generates message inform information.

Next, the group service server transmits the generated message inform information to all of the users registered in the relevant group. At this point, the group service server may transmit the message inform information at a time set by the user.

Accordingly, the mobile terminal receives the message inform information transmitted by the group service server.

The mobile terminal which has received the message inform information determines user information stored in advance, i.e., login information for accessing the relevant group, and accesses the relevant group.

The mobile terminal which has accessed the relevant group receives and stores the group message, and releases the access to the relevant group which has been accessed.

As described above, according to exemplary embodiments of the present invention, in order to determine a message generated from a relevant group without accessing the relevant group in a mobile communication system providing IMPS, when it is determined that the message inform information is transmitted from the relevant group, a mobile terminal automatically accesses the relevant group and receives the message, so that even a user who has not accessed the relevant group can receive a message anytime.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A group service server for providing a group service to a plurality of mobile terminals, the group service server comprising:

- a message generator configured to generate message inform information informing of presence of a group message initiated by a member of a relevant group to be transferred to all users registered in the relevant group; and
- a server controller configured to transmit, via a communication unit of the group service server, the generated message inform information to each of the plurality of mobile terminals respectively corresponding to all of the users registered in the relevant group and configured to transmit the group message to all users registered in the relevant group,
- wherein the server controller transmits the group message to a respective user registered in the relevant group after receiving an automatic response from the respective user or transmits the group message to all users registered in the relevant group after transmitting the message inform information without receiving any response to the message inform information,
- wherein access to the relevant group and corresponding messages of the relevant group is restricted to verified members of the relevant group,
- wherein at least one of the server controller and the message generator is a hardware component.

2. The group service server of claim 1, wherein the server controller allows the message inform information generated by the message generator to be transmitted at a time set by a user who desires to transmit the group message.

3. The group service server of claim 2, wherein the group message comprises an attached file comprising at least one of a media file and an image file.

4. A method for providing a group service to a plurality of mobile terminals in a group service server, the method comprising:

- generating, by the group service server, message inform information informing of presence of a group message initiated by a member of a relevant group to be transferred to all users registered in the relevant group; and
- transmitting, by the group service server, the generated message inform information to each of the plurality of mobile terminals respectively corresponding to all of the users registered in the relevant group and the group message to all users registered in the relevant group, wherein the server controller transmits the group message to a respective user registered in the relevant group after receiving an automatic response from the respective user or transmits the group message to all users registered in the relevant group after transmitting the message inform information without receiving any response to the message inform information, and wherein access to the relevant group and corresponding messages of the relevant group is restricted to verified members of the group.

5. The method of claim 4, wherein the transmitting of the generated message inform information comprises transmitting the generated message inform information at a time set by a user who desires to transmit the group message.

6. The method of claim 5, wherein the group message comprises an attached file comprising at least one of a media file and an image file.

* * * * *